US008751841B2

(12) United States Patent
Mendes-Carvalho et al.

(10) Patent No.: US 8,751,841 B2
(45) Date of Patent: Jun. 10, 2014

(54) DATA PROCESSING SYSTEM, METHOD FOR PROCESSING DATA AND COMPUTER PROGRAM PRODUCT

(75) Inventors: Jose Mendes-Carvalho, Venerque (FR); Xavier Boucard, Gardouch (FR); Yaney Rodriguez, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 430 days.

(21) Appl. No.: 12/600,055

(22) PCT Filed: May 29, 2007

(86) PCT No.: PCT/IB2007/052721
§ 371 (c)(1),
(2), (4) Date: Nov. 13, 2009

(87) PCT Pub. No.: WO2008/146099
PCT Pub. Date: Dec. 4, 2008

(65) Prior Publication Data
US 2010/0313046 A1    Dec. 9, 2010

(51) Int. Cl.
*G06F 1/00*    (2006.01)
(52) U.S. Cl.
USPC ............................ 713/323; 713/300; 713/320
(58) Field of Classification Search
USPC .................. 713/300, 320, 323; 718/100, 102
See application file for complete search history.

(56) References Cited

U.S. PATENT DOCUMENTS 6,965,763 B2 * 11/2005 Bussan et al. .............. 455/343.4
7,054,972 B2 * 5/2006 Parry et al. .................... 710/260
7,079,811 B2 * 7/2006 Lee et al. ...................... 455/41.2
8,259,576 B2 * 9/2012 Lee et al. ........................ 370/235
2005/0164637 A1 * 7/2005 Pattabiraman et al. ...... 455/41.2

FOREIGN PATENT DOCUMENTS

EP    1677175 A2    7/2006

OTHER PUBLICATIONS

J. Corbet: "Deferrable Timers", Linux Weekly News, Online, Mar. 28, 2007, XP002461966.
T. Gleixner, D. Niehaus: "Hrtimers and Beyond: Transforming the Linux Time Subsystems" 2006 Linux Symposium, Online, vol. 1, Jul. 19, 2006, pp. 333-346.
A. Van De Ven: "Intel Announces the PowerTOP Utility for Linux", Online, May 11, 2007, XP002461076.
J. Corbet: "Clockevents and Dyntick", Linux Weekly News, Online, Feb. 21, 2007, XP002461065.
International Search Report and Written Opinion correlating to PCT/IB2007/052721 dated Jan. 11, 2008.

* cited by examiner

*Primary Examiner* — Jaweed A Abbaszadeh

(57) ABSTRACT

A data processing system includes one or more processing unit arranged to execute sets of instructions stored in the data processing system. The sets may include two or more application sets, each forming an application sets and including instructions for scheduling for the application an event at a future point in time. The event may require the processing unit to be in an active mode. The sets may further include rescheduling instructions for receiving from the applications information about the scheduled events and determining whether or not one or more of the events can be rescheduled and rescheduling a reschedulable event to a new point in time. The sets may further include mode control instructions for controlling the processing unit to be in the active mode during a time interval which includes the new point in time and to be in a low power mode in which the processing unit consumes less energy than in the active mode during a period of time adjacent to the time interval.

20 Claims, 2 Drawing Sheets

DATA PROCESSING SYSTEM, METHOD FOR PROCESSING DATA AND COMPUTER PROGRAM PRODUCT

FIELD OF THE INVENTION

This invention relates to a data processing system, to a method for processing data and to a computer program product.

BACKGROUND OF THE INVENTION

It is known in the art of computer systems to use timers to schedule events which have to take place in the future. For example, one or more software applications may be running on the computer system which require some periodic activity, such as monitoring the status of a battery or checking the connection to a network. In order to schedule an event, it is known to send a request from the software application to the operating system. The operating system sets a timer in response to the request, which expires at a point in time in the future. Upon expiry of the timer, the event associated with the timer is performed e.g. by executing by a processor program code of the application that requested the timer.

However, a disadvantage of the known systems is that they consume a relatively high amount of power.

SUMMARY OF THE INVENTION

The present invention provides a data processing system, a method for processing data and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
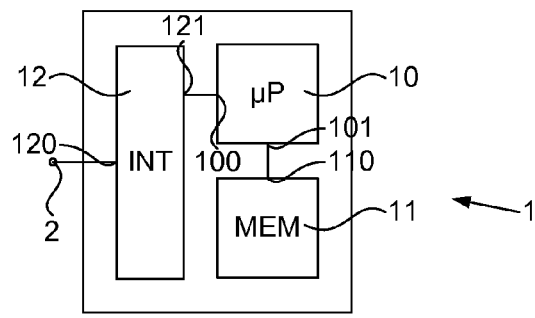
FIG. 1 schematically shows an example of an embodiment of a data processing system.

Referring to FIG. 1, a data processing system 1 is shown. The data processing system 1 may, as shown include one or more processing units 10 (in the example of FIG. 1, for sake of clarity only a single processing unit is shown, however the data processing system 1 may include two or more processing units).

When operating, the processing unit(s) 10 may execute two or more sets of instructions stored in the data processing system 1. The processing unit(s) 10 may for example include a general purpose processor, in which case a part or all of the instructions may for example be stored in a memory as data which can be read by the processing unit(s) 10 and which give the general purpose processor a functionality defined by the data. The example of a data processing system 1 shown in FIG. 1, includes for instance a memory 11 connected with a memory interface 110 to an input and/or output (I/O) interface 101 of the processing unit 10. In the memory 11 the instructions can be stored, which may then be read (via the interfaces 101,110) and executed by the processing unit(s) 10.

However, a part or all of the instructions may also be stored in the processing unit(s) 10, for example in case the processing unit(s) 10 is implemented as a dedicated logic circuit which has a fixed functionality, such as an application specific integrated circuit (ASIC). The instructions may for example be stored as a suitable arranged configuration of logical device hardware, such as AND ports, OR ports and the like.

As shown in FIG. 1, the data processing system 1 may further include one or more peripheral devices. The peripheral devices may be connected to the processing unit. The data processing system 1 may for example include a communication interface module 12 or other peripheral devices. As shown, the module 12 may for example be connected with an interfacing I/O 120 to an I/O port 2 of the data processing system 1 and with another interfacing I/O 121 to I/O port 100 of the processing unit 10.

For sake of clarity, in the following an example will be described as having different modules. However, it will be apparent that each of the modules may be implemented as a set of executable instructions which, when executed by the processing unit(s) 10, enables the processing unit(s) 10 to perform the functions of the respective module and to provide the interaction with other modules as explained below.

Figure 2:
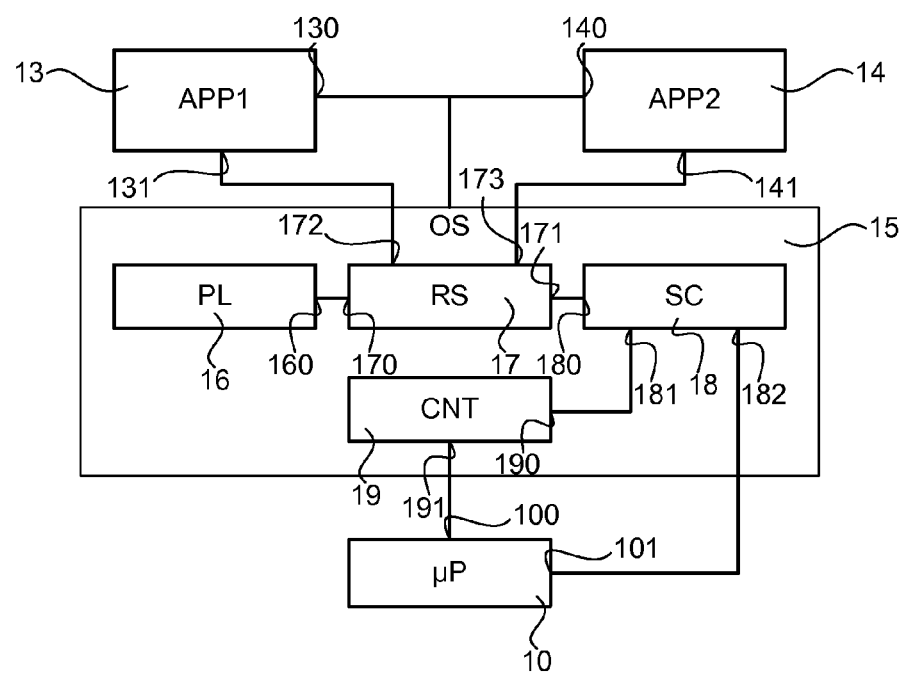
FIG. 2 schematically shows a functional diagram illustrating a set of instructions suitable for a data processing system.

Referring to FIG. 2, the data processing system 1 may include two or more application modules. In FIG. 2, a first application module 13 for executing a first application APP1 and a second application module 14 for executing a second application APP2 are shown. The applications APP1,APP2 may for example be applications which require a repeated wake up of the processing unit(s) 10 to perform a check. The applications APP1,APP2 may for instance include one or more of: a user clock refresh application, battery monitoring application, a network reception application, temperature monitoring application, Bluetooth sniff mode application, GPS sniff mode application, charger detection application, USB host application. However, the applications APP1,APP2 may also be other applications. The check may for instance be performed periodically. The check may for instance be performed at time intervals, which may be regular, in a range from, for example, a second or less to a minute or more, such as an hour or more.

Figure 3:
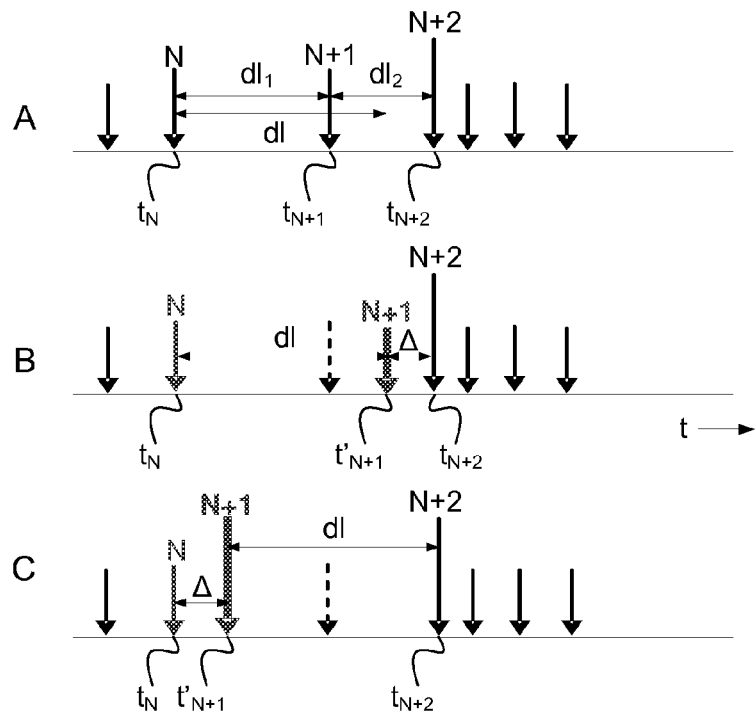
FIG. 3 schematically shows a timing diagram illustrating an example of a method of rescheduling of events.
Figure 4:
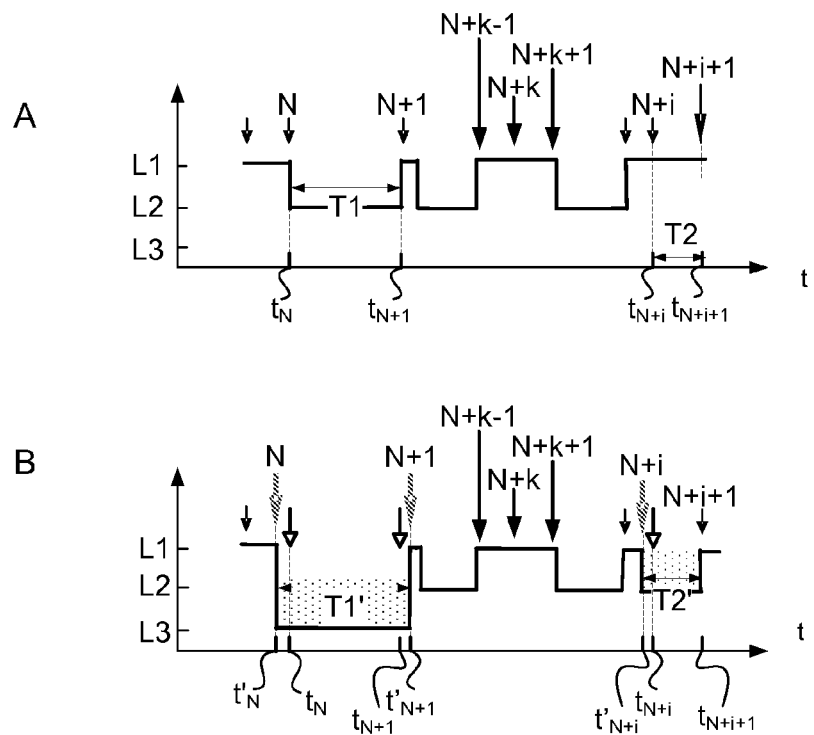
FIG. 4 schematically shows a graphing illustrating another example of a method of rescheduling of events.

As illustrated in FIGS. 3 and 4, the application modules 13,14 may each schedule one or more events N,N+1, . . . for the respective application APP1,APP2 at one or more future points in time $t_N, t_{N+1}, \ldots$ . The application APP1, APP2 may, at the scheduled point in time $t_N, t_{N+1}$ cause the processing unit(s) 10 to perform a task which forms a part of the respective application APP1,APP2. For instance, the application modules 13,14 may at the scheduled point in time cause a check of the amount of power of a battery or the refreshing of a timer value for a clock or another action which requires the processing unit to be in an active mode.

As shown in FIG. 2, the data processing system 1 may include a rescheduling module (RS) 17. The rescheduling module 17 may determine whether or not one or more of the events N N,N+1, . . . can be rescheduled and reschedule an reschedulable event a new point $t'_N, t'_{N+1}, t'_{N+i}$ in time. The rescheduling module 17 may receive information about the scheduled timing at the interfaces 172,173 and determine a new point $t'_N, t'_{N+1}, t'_{N+i}$ based on the received information. In the example of FIG. 2 the rescheduling module 17 is for instance shown with interfaces 172,173 connected to a respective interface 131,141 of the application modules 13,14. However, the rescheduling module 17 may also be connected to another source of information about the scheduled events N,N+1, . . . , such as to a part of an operating system which schedules the events N,N+1, . . . .

By rescheduling one or more of the scheduled events, the amount of power consumed by the processing unit(s) 10, and hence by the data processing system 1, may be reduced. For example, in case the time-interval between the points in time $t_N, t_{N+1}, \ldots$ at which successive first and second events (such as events N and N+1 or N+1 and N+i+1 shown in FIG. 3) are scheduled is such that the switching to the low power mode after the first event and switching to the active mode after the second event consumes more power than is saved by being in the low power mode between the successive events N,N+1; N+i,N+i+1, the first event and/or the second event may be rescheduled to a new point $t'_N, t'_{N+1}, t'_{N+i}$ which allows a saving of power.

Also, when the processing unit(s) 10 enters in the low power mode only after a certain period of inactivity, the period between the points $t_N, t_{N+1}, \ldots$ at which the successive events N,N+1;N+i,N+i+1 are scheduled may be too short to react. By rescheduling the period of time may be made long enough for the processing unit(s) 10 to enter in the low power mode.

As shown in FIG. 2, the data processing system 1 may include a mode control module (CNT) 19. The power mode control module (CNT) 19 may control the processing unit(s) 10 to be in a low power mode (indicated L2,L3 in FIG. 4) in which the processing unit consumes less energy than in the active mode (indicated L1 in FIG. 4). The power mode control module 19 may control the processing unit(s) 10 to be in the active mode during a time interval (indicated T1',T2' in FIG. 4) which includes the new point in time $t'_N, t'_{N+1}, t'_{N+i}$. As shown in FIG. 2, the power mode control module 19 may for example be connected with an output interface 191 to a mode control input 100 of the processing unit(s) 10 via which the power mode of the processing unit(s) 10 can be controlled.

As shown in FIG. 4B with interval T1', the power mode control module 19 may for example control the processing unit 10 to be in a low power mode L3 during a period of time directly preceding the new time $t'_{N+1}$. As shown in FIG. 4B with interval T2', the power mode control module 19 may for example control the processing unit 10 to be in a low power mode L3 during a period of time following directly after the rescheduled event N+i. However, as shown in FIG. 4 with events N+k−1,N+k, N+k−1 the processing unit 10 may have already be in the active mode L1 during a period of time preceding an event N+k and/or remain the active mode after an event N−k−1. In this respect, it will be apparent that 'directly' is meant to be as 'soon as possible' since it may take some time to switch from or to the low power mode and/or to finalise the event.

The power mode control module 19 may receive timing information from the event scheduling module. The power mode control module 19 may for instance, be connected with an input interface190 to an interface 181 of an event scheduling module 18 which controls the timing of the scheduled events N,N+1, . . . . The power mode control module 19 may for example receive information about the points in time the events are scheduled and determine, based on this information, whether or not the processing unit(s) 10 may be switched from an active mode into a low power mode. For example, the power mode control module 19 may compare the period of time between successive scheduled events with a minimum period of time at which the amount of power saved in the respective low power starts exceeding the additional amount of energy required to switch to the respective low power mode.

The power mode control module 19 be arranged to execute an operation which may be described with the following pseudo-code:

```
If abs(t_N− t_{N+1})> dl(mode 3)
   then
      {
      if abs(t_N− t_{N+1})> dl(mode 2)
      then when time = t_N set power to L2
      else when time = t_N set power to L3
      }
   else when time = t_N set power = L1
```

In this pseudo-code, abs( ) represents the absolute value of the parameter between ( ); dl(level) a predetermined minimum period of time at which the power saved in the respective low power mode starts exceeding the additional amount of energy required to switch to the respective low power mode; 'power' the power level of a certain mode; and L1-L3 different power levels of the processing unit. For example, L1 may be the active mode level, L2 a stop mode power level and L3 a (deep) sleep mode level.

The event scheduling module 18 may for instance be connected with an input interface 180 to an output interface 171 of the rescheduling module 17. At the input interface 180, the event scheduling module 18 may receive information about the (rescheduled) events N,N+1, . . . . The event scheduling module 18 may control the processing unit(s) 10, based on the received information, to execute the instructions for the specific events N,N+1, . . . at the points in time as scheduled by the rescheduling module 17. For example, the rescheduling module 17 may have maintained the scheduling of an event N at original time $t_N$ and may have rescheduled an event N+1 at a new time $t'_{N+1}$ instead of original time $t_{N+1}$. The event scheduling module 18 may monitor the time and control the processing unit(s) 10 to execute the event N at the scheduled time $t_N$ and to execute the event N+1 at the rescheduled time $t'_{N+1}$. As shown in FIG. 2, for example, an output interface 182 of the event scheduling module 18 may be connected to a control interface 101 of the processing unit(s) 10, via which the event scheduling module 18 may control execution and timing of the events by the processing unit(s) 10.

The events N,N+1, . . . may be scheduled in any manner suitable for the specific implementation. For instance, as shown in FIG. 2, the modules 13,14 may be connected to an operating system (OS) module 15. The operating system module 15 may for instance manage the first application module 14 and the second application module 15 and manage at least a part of resources of the data processing system 1. For example the operating system module 15 may control the access to the resources by the application modules 14,15, such as the access to memory, to peripheral devices 12 and/or control scheduling the processing of instructions from the applications APP1, APP2 by the processing unit(s) 10

The modules 13,14 may for example transmit to the operating system module 15 a request to schedule the event. The OS module 15 may schedule the events, e.g. in response to the request. The OS module 15 may for instance schedule the events based on a given periodicity of the event(s). For example an event N, such as checking the status of a battery, may be periodic. The event may for example recur at regular or irregular intervals. The interval may be any interval suitable for the specific event and may for instance be in the range from microseconds to minutes or hours. After scheduling the events, the OS module 15 may transmit information about the scheduled events to the rescheduling module 17.

The rescheduling module 17 may operate in any manner suitable for the specific implementation. The rescheduling module 17 may for instance determine whether a power consumption of the processing unit(s) 10 can be reduced by rescheduling the first event and/or the second event. As for instance shown in FIG. 2, the rescheduling module 17 may be connected to an policy (PL) module 16. In the policy module 16 one or more sets of rules may be stored which can be used by the rescheduling module 17 to determine whether or not a scheduled event can be rescheduled and what the new point in time is to be in case the event can be rescheduled.

An example of a rescheduling operation is illustrated in FIG. 3, of which diagram A illustrates the timing of events before rescheduling and diagrams B and C after rescheduling.

The policy module 16 may include a set of rules for determining whether a scheduled event N+1 can be rescheduled. The set of rule may for example determine whether or not the power consumption can be reduced and/or whether or not a number of mode transitions of the processing unit can be reduced. As illustrated in FIG. 3B, the policy module 16 may for example include a set of rules, which can be described with the following first example of pseudo-code:

```
if ((t_{N+2} − t_N) > dl) and (t_{N+1} not accurate))
   then delay t_{N+1} such that t'_{N+1} − t_N >= dl_{1,2}))
else
   no modification
```

Also, as illustrated in FIG. 3C, the policy module 16 may include a set of rules for determining whether a scheduled event N+1 can be rescheduled, which can be described with the following second example of pseudo-code:

```
if ((t_{N+2} − t_N) > dl) and (t_{N+1} not accurate))
   then forward t_{N+1} such that t'_{N+1} − t_{N+2} >= dl_{1,2}))
else
   no modification
```

(in which examples of pseudo-code dl represents a predetermined minimum period of time at which the amount of power saved in the respective low power starts exceeding the additional amount of energy required to switch to the respective low power mode). In which the term 'not accurate' means that the respective time $t_{N+1}$ is not required to be accurate, that is the time $t_{N+1}$ may be varied beyond an accuracy limit of, for instance 2%.

The policy module 16 may include a set of rules which controls the dispersion of the rescheduled events. For instance, the policy module 16 may include one or more desired values for properties of the amount the scheduled point in time is changed, such as a predetermined value for the average amount the point in time may be changed, a value for the desired frequency of a recurring event and a value for the allowed maximum deviation from this frequency.

The policy module 16 may further include information about a current value of those properties, for example a moving average of the time-interval between recurrences of a periodic event. The policy module 16 may receive from the rescheduling unit 17 information about the amount a point in time for a scheduled event is changed and store this information allowing the rescheduling unit 17 to calculate the current value from the received information or the policy module 16 may calculate the value itself.

The rescheduling module 17 may, when using the set of rules, for instance calculate the value the respective parameter would have when the respective event would be rescheduled and compare this hypothetical value with the predetermined value. The rescheduling module 17 may then reschedule the event in case the result of the comparison meets a predetermined criterion, e.g. that the difference between the hypothetical value and predetermined value is less than an allowed maximum difference.

The policy module 16 may further include a set of rules for scheduling a new point $t'_N$, $t'_{N+1}$, $t'_{N+i}$. For example, the rescheduling module 17 may, when using the set of rules, delay or anticipate $t'_{N+1}$ by setting $t'_{N+1}$ to $t_N+\Delta$ (in case of a delay) or to $t_{N+2}+\Delta$ (in case of a forwarding) with $\Delta$ being a predetermined minimum difference in time between successive events, as for instance illustrated in FIG. 3B with events N+1 and N+2 and with events N and N+1 in FIG. 3C. However, the change $\Delta$ may also be determined dynamically, for example based on the determine difference between the hypothetical value and predetermined value.

The rescheduling module 17 may for example schedule a new point $t'N$, $t'_{N+1}$, $t'_{N+i}$ according to a time variation profile. For example, the new point $t'_N$, $t'_{N+1}$, $t'_{N+i}$ may be set such that the difference between the hypothetical value and predetermined value remains stable or is reduced. For example, in case the hypothetical value exceeds the predetermined value, the new point $t'_N$, $t'_{N+1}$, $t'_{N+i}$ may be set such that the hypothetical value is reduced or in case the hypothetical value is below the predetermined value, the new point $t'_N$, $t'_{N+1}$, $t'_{N+i}$ may be set such that the hypothetical value is increased. For instance in case the value represents the desired frequency $f_{desired}$, the rescheduling module may execute an operation as may be described with the pseudo-code;

```
if f_{hypothetical} > f_{desired}
   then t'_{N+1} = t_N + Δ
else if f_{hypothetical} < f_{desired}
   then t'_{N+1} = t_N − Δ
```

The policy module 16 may further include a set of rules for scheduling a new point $t'_{N+1}$ for which the difference in time with the second point in time $t_{N+2}$ is smaller than the difference in time between the first point in time $t_N$ and the new in time $t'_{N+1}$, as e.g. illustrated in FIG. 3B.

The invention may also be implemented in a computer program loadable in a memory of a programmable apparatus including a processing unit. The computer program product may include program code portions for executing, when run by the programmable apparatus, a set of instructions, forming an operating system. The set may include rescheduling instructions (17) for determining whether or not an event scheduled at a future point in time can be rescheduled and rescheduling the event to a new point t'N, $t'_{N+1}$, $t'_{N+i}$. The set may further include mode control instructions (19) for controlling the processing unit.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, for example, the processing unit may include a microprocessor (µP) or a microcontroller (µC). The microprocessor may for example include a central processing unit (CPU) and/or a coprocessor and/or a digital signal processor and/or an embedded processor.

Also, the invention is not limited to physical devices or units implemented in non-programmable hardware but can also be applied in programmable devices or units able to perform the desired device functions by operating in accordance with suitable program code. Furthermore, devices may be physically distributed over a number of apparatuses, while functionally operating as a single device. For example, the processing unit may include two or more microprocessors connected in a manner suitable to cooperate as a processing unit.

Also, devices functionally forming separate devices may be integrated in a single physical device. For example, the memory 11 may be integrated with the processing unit 10 in a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A data processing system, comprising:
a memory; and
a processing unit arranged to execute instructions stored in the memory, the instructions including:
at least two applications, each application including instructions for scheduling an event at a future point in time, each event requiring the processing unit to be in an active mode;
rescheduling instructions for:
receiving from the two applications information about each event;
determining that a power consumption of the processing unit can be reduced by the rescheduling of a first one of the events scheduled for a first point time, wherein the determining comprises comparing a period of time between the first event and a second one of the events with a period of time at which an amount of power saved in respective transitions from a low power mode to the active mode exceeds an additional amount of power required to switch to the to low power mode; and
rescheduling the first event to a first new point in time in response to the determining that the power consumption of the processing unit can be reduced; and
mode control instructions for controlling the processing unit to be in the active mode during a time interval which includes the first new point in time and to be in the low power mode during a period of time adjacent to the time interval in response to determining that the power consumption of the processing unit can be reduced.

2. The data processing system of claim 1, including operating system instructions including the said rescheduling instructions and the mode control instructions.

3. The data processing system of claim 1, wherein the rescheduling instructions include instructions for rescheduling a second one of the events scheduled at a second point in time to a second new point in time, for which a difference in time between the second new point in time and a third point in time at which a third one of the events is scheduled is smaller than a difference in time between the first point in time and the second point in time.

4. The data processing system of claim 1, wherein the rescheduling instructions include instructions for rescheduling a second one of the events scheduled at a second point in time to a second new point in time, for which a difference in time between the second new point in time and a third point in time at which a third one of the events is scheduled is below a maximum difference.

5. The data processing system of claim 4, including instructions for determining the maximum difference.

6. The data processing system of claim 1, wherein determining that the power consumption can be reduced includes:
determining that a number of mode transitions of the processing unit can be reduced.

7. The data processing system of claim 1, wherein the rescheduling instructions include instructions for rescheduling the first event to the first new point in time according to a time variation profile.

8. The data processing system of claim 1, wherein the mode control instructions include instructions for selecting the low power mode from at least two different low power modes.

9. The data processing system of claim 1 wherein the rescheduling instructions include instructions for rescheduling a second one of the events to a second new point in time which lies within an interval of time including a third point in time at which a third one of the events is scheduled is.

10. The data processing system of claim 1, further comprising:
a policy module including:
a rule for controlling the rescheduling of the events; and
a value for a property of an amount that a scheduled point in time associated with an event is changed.

11. The data processing system of claim 10, wherein the property comprises at least one of an amount the scheduled point in time can be changed, a value for a frequency for a first recurring event, and a value for a maximum deviation from a frequency value for a second recurring event.

12. A method for processing data with a data processing system including a processing unit, the method including comprising:
executing by the processing unit at least two applications, the executing including scheduling for each of the applications a respective event at a future point in time, each event requiring the processing unit to be in an active mode; and executing an operating system including:
- receiving from the at least two applications information about the respective events;
- determining that a power consumption of the processing unit can be reduced by the rescheduling of a first one of the events scheduled for a first point in time, wherein the determining comprises comparing a period of time between the first event and a second one of the events with at which an amount of power saved in respective transitions from a low power mode to the active mode exceeds an additional amount of power required to switch to the tow power mode;
- rescheduling the first event to a first new point in time in response to the determining that the power consumption of the processing unit can be reduced; and
- controlling the processing unit to be in the active mode during a time interval which includes the first new point in time and to be in the low power mode during a period of time adjacent to the time interval in response to determining that the power consumption of the processing unit can be reduced.

13. The method of claim 12, further comprising:
executing a policy module including:
- a rule for controlling the rescheduling of the events; and
- a value for a property of an amount that a scheduled point in time associated with an event is changed.

14. The method of claim 13, wherein the property comprises at least one of an amount the scheduled point in time can be changed, a value for a frequency for a first recurring event, and a value for a maximum deviation from a frequency value for a second recurring event.

15. The method of claim 12, further comprising selecting the low power mode from at least two different low power modes.

16. A computer program product included in a non-transitory memory of a programmable apparatus including a processing unit, which computer program product includes program code portions for executing, when run by the programmable apparatus, a set of instructions which includes:
- instructions for receiving information about events for at least two application sets, wherein the events are scheduled at a future point in time;
- rescheduling instructions for;
  - determining that a power consumption of the processing unit can be reduced by the rescheduling of a first one of the events scheduled for a first point in time, wherein the determining comprises comparing a period of time between the first event and a second one of the events with a period of time at which an amount of power saved in respective transitions from a low power mode to the active mode exceeds an additional amount of power required to switch to the low power mode; and
  - rescheduling the first event to a first new point in time in response to the determined that the power consumption of the processing unit can be reduced;
- mode control instructions for controlling the processing unit to be in an active mode during a time interval which includes the first new point in time and to be in a low power mode in which the processing unit consumes less energy than in the active mode during a period of time adjacent to the time interval in response to determining that the power consumption of the processing unit can be reduced; and
- policy instructions for determining that the rescheduling of the at least one event to the new point in time results in a difference between an original time for the at least one event and the new point in time that is within a predetermined value.

17. The computer program product of claim 16, wherein the rescheduling instructions include instructions for rescheduling the first event to the first new point in time for which a difference in time between the first new point in time and a second point in time at which a second event is scheduled is below a maximum difference.

18. The computer program product of claim 16, wherein the predetermined value comprises an average amount of time that the original time can be changed.

19. The computer program product of claim 16, wherein the predetermined value comprises a frequency of occurrence of the at least one event and an allowed maximum deviation from the frequency of occurrence.

20. The computer program product of claim 16, wherein the mode control instructions further include instructions for selecting the low power mode from at least two different low power modes.

* * * * *